Aug. 17, 1971 L. G. ARNDT 3,600,213
APERTURE MASKS
Filed Sept. 12, 1969

INVENTOR
LLOYD G. ARNDT
BY Stryker & Jacobson
ATTORNEYS 3,600,213
APERTURE MASKS
Lloyd G. Arndt, St. Paul, Minn., assignor to Buckbee-Mears Company, St. Paul, Minn.
Filed Sept. 12, 1969, Ser. No. 857,437
Int. Cl. C23c *11/08, 11/10*
U.S. Cl. 117—46CG 3 Claims

ABSTRACT OF THE DISCLOSURE

An improved method for temporarily reducing the diameter of the apertures in a shadow mask by vapor depositing a layer of carbon on a preformed aperture mask.

BACKGROUND OF THE INVENTION

Field of the invention

This invention relates generally to the fabrication and assembly of color TV picture tubes containing aperture masks and, more particularly, to the manufacturing steps utilizing the aperture mask to form a phosphor dot pattern on the face plate.

Description of the prior art

Conventionally, the three primary color phosphor dots are formed on the inside surface of the glass face plate of a color TV picture tube by using an aperture mask as a pattern. After these dots have been formed the same mask is permanently attached in the tube to provide its normal function of directing the electron beams to strike the proper phosphor dots. In this prior art process the permanently attached aperture mask has larger openings than those in the same mask when it was used as a pattern for forming the phosphor dots. This requires enlarging the openings after using the mask as a pattern or temporarily stepping down the diameter of the openings prior to the step of forming the pattern on the face plate.

Conventional color TV aperture-mask picture tubes use various processes for forming the three primary color phosphor dots on the viewing face of the tube. The construction, operation and function of the aperture mask are all disclosed and described in the prior art, for example, in an article tilted "Constructing the Tri-Color Picture Tube," Electronics, p. 86 published May 1951; in U.S. Pat. 3,146,368 to Fiore et al. dated August 1964; in U.S. Pats. 2,795,719 to Morrell and 2,802,964 to Jesty dated August 1957. Typically, the primary color phosphor dots are formed using techniques which involve using the same aperture mask that is eventually made a permanent part of the picture tube. The reason for using the same mask is that the relative locations of the dots and the mask apertures are so critical that it has been extremely difficult to use one mask for dot forming and to use another mask for focusing purposes and still obtain exact reproducibility, even though both masks might have been made from the same basic pattern. To use the same mask with identical sized holes for both functions is disadvantageous because it reduces the brilliance of the picture that can be obtained.

To overcome this disadvantage numerous schemes have been devised to temporarily reduce the diameter of the apertures. One of these is described in the Law U.S. Pat. 3,231,380. In this patent the aperture mask is formed in a conventional manner by using photographic techniques to form a pattern in a protective coating of enamel located on a sheet of metal. The holes are then etched to the largest usable size. Then, while the enamel is still in place, the holes are partially filled with a material different from the base metal. The mask is then used for forming the phosphor dot pattern but, before the mask is permanently installed in the tube the filling material is removed from the openings. While this scheme works in theory, there are practical limitations. For one, once the coated metal has gone through an etching bath or spray, the enamel that remains has usually deteriorated sufficiently that it can no longer serve as an adequate protective coating. For another, before the mask can be used to form the phosphor dot pattern, it must be shaped aspherically or domed which requires mechanical working and heat treating which would destroy the enamel coating. To fill the openings before the mask is domed is impractical because the shaping would alter the size and shape of the openings. Another prior art method involves electroplating over the mask with a filler material such as zinc. The zinc filler material partially covers up the openings to reduce the diameter of the apertures to a predetermined size. Although this method works well it requires numerous steps to clean the mask, deposit the plating evenly, and then remove the plating.

A review of the known prior art reveals that very complex and costly methods and means have been used to achieve this temporary stepping down of the apertures. The present invention, in contrast, is relatively simple and considerably reduces the cost involved in temporarily stepping down the apertures of the shadow mask.

SUMMARY

In this invention the base metal aperture mask is formed in the conventional manner, using photoprinting and chemical etching techniques, and is then shaped or domed with the enamel coating removed. For forming the phosphor dots, the openings in the mask are partially closed according to the teachings of this invention. After the phosphor dots have been formed on the face plate, the openings are enlarged to their original size. According to the teachings of this invention the mask is coated with a fine layer of carbon which deposits over the face of the apertures to uniformly reduce the diameter of the apertures. After the phosphor dots have been formed with the smaller apertures, the carbon is removed and the mask is attached to the inside of the television tube.

DESCRIPTION OF THE PREFERRED EMBODIMENT

Figure 1:
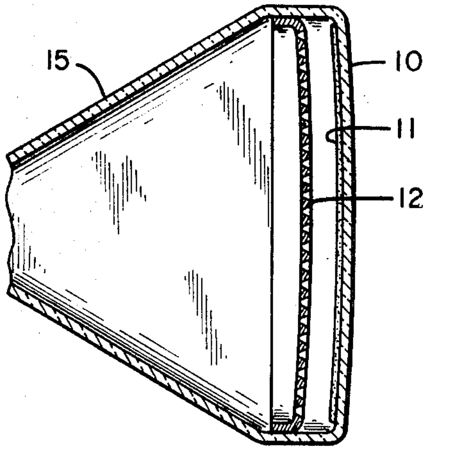
FIG. 1 is a somewhat functional partial cross-section view of the forward part of a color TV picture tube, greatly simplified, illustrating the arrangement of the component parts with which the present invention is involved.

The conventional color TV aperture mask picture tube has a glass face plate or viewing face 10 which is coated on its inside surface with a layer of phosphor dots 11 representing the three primary colors. In the drawing the phosphor dots are represented as a uniform layer 11, there being no intent to illustrate the dot pattern. Within the tube envelope and located between the electron guns, not shown, and the phosphor layer 11 is an aperture mask 12 ordinarily made out of a thin sheet of metal, such as cold rolled steel. The mask contains a translucent area formed by a myriad of miniature openings or apertures through which the electron beams pass when traveling toward the face plate 10 to strike the layer of phosphor 11. The electron guns which eject the electron beams are located at the rear of the picture tube within the funnel shaped glass closure 15. Other component parts of the picture tube such as shields, deflecting plates or coils, mounting hardware for the aperture mask, etc. have been deleted to simplify the drawing since they do not constitute an essential part of the invention nor are they necessary to fully describe the present invention.

Processes used to form the phosphor layer 11 on the face plate 10 are well known in the art and are described in detail in publications such as Kaplan U.S. Pat. 2,959,483. As set forth in greater detail in the prior art, briefly this process may involve initially coating the inside surface of the face plate 10 with a first primary color phosphor in a sensitized carrier and exposing this coating to a suitable source of energy, such as light, through an aperture mask 12. Where the light strikes, hardened spots of the first color phosphor are formed and the unhardened areas are then washed away and removed. This is followed by applying a layer of a second primary color phosphor in a suitably sensitized carrier and exposing the second layer to an energy source through the aperture mask 12 in the same manner as before. Either the beam from the energy source or the mask is shifted slightly so that the newly exposed areas are slightly displaced from those exposed earlier. The unhardened areas of the second layer of phosphor are then washed away and removed. Finally, the third primary color phosphor coating is applied and processed in a similar manner with the dots formed thereby being slightly displaced from the other two sets of phosphor dots. By this process there are formed sets of elemental areas comprising a triad of as few as three discrete primary color phosphor dots but preferably six or more are formed. It is quite critical that each of these discrete dots be precisely located with respect to one another within a set and that each set be precisely located wilth respect to the other sets. Because of minute, almost imperceptible differences that may exist between aperture masks, it is best and virtually mandatory, with the present state of the art, that the same mask be used to form each of the three colored dots and that this same mask be permanently assembled in the picture tube for its operational function of guiding the electron beams onto the respective phosphor dots.

Figure 2:
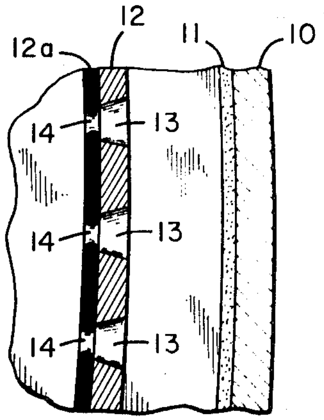
FIG. 2 is a somewhat enlarged, partial cross-sectional view illustrating an embodiment of the invention of a mask with a carbon covering layer on one side for partially closing the openings.

Turning first to FIG. 2, the base mask 12 can be made using well-known photoprinting and chemical milling or etching techniques and process steps which are described in the prior art such as in Electronics article, supra, or in Mears U.S. Pats. 2,762,149 and 2,822,635 and other patents referenced therein and in what is now regarded as a conventional manner, but with some variations. As described in greater detail in the prior art, briefly these process steps involved in forming an aperture mask include coating a thin sheet of metal, such as .01 inch cold rolled steel, with a sensitized enamel or the like and then exposing the sensitized coating to a suitable light source through a plate containing an array of opaque and transparent areas including miniature dot-like areas defining the desired aperture pattern. The plate is ordinarily a positive so that light will not strike those areas which are to form the openings in the metal sheet so that the sensitized coating will not harden in those areas and will be washed away after exposure by subsequent developing treatment. In the ordinary procedure, the dot pattern is photoprinted similary in register on both sides of the metal, with the dots on one side being somewhat smaller than their counterparts on the other side.

After the desired patterns have been photoprinted, etched and cleaned, a carbon layer 12*a* is deposited on the side of mask 12 that contains the smaller size openings.

The essence of the present invention is in the vapor deposition of the carbon layer 12*a* on the mask to reduce the diameter of the apertures. Heretofore, it has been impossible to produce a uniform reduction in the diameter of the aperture unless elaborate time consuming techniques such as electroplating or the like were used.

While it is relatively easy to produce carbon by burning solid, liquid, or gaseous combustible products in an atmosphere of insufficient oxygen, not all carbon produced in this manner is satisfactory to deposit on the mask. This is believed attributed to the incomplete combustion of either the solid or liquid fuel, which leaves particles of uneven size that do not deposit uniformly onto the mask but instead build up unevenly. However, with incomplete combustion of fuel in a gaseous state, the carbon particles remain uniform in size and deposit uniformly onto the mask to evenly and smoothly reduce the diameter of the apertures. The present invention resides in the discovery that burning a gaseous fuel such as natural gas with insufficient air produces a smoky carbon flame that deposits carbon over the aperture mask to uniformly and smoothly reduce the diameter of the apertures. Although the process of forming carbon black by burning natural gas with insufficient oxygen is well known in the prior art, it is the discovery that depositing carbon formed from natural gas directly onto an aperture mask will uniformly and smoothly reduce the diameter of the apertures by forming a layer of carbon that extends partially over the edges of the apertures. The feature of the carbon deposition that enables this technique to be used is that the carbon builds out smoothly laterally as well as vertically from the face of the mask.

Once the phosphor dot layer 11 has been formed on the face plate 10, the carbon layer 12*a* is no longer needed and, as a matter of fact, if allowed to remain would reduce the brightness of the picture produced on the viewing face of the tube. Therefore, this layer is then stripped away. Preferably, this is done by using a suitable solvent such as hot trichlorethylene vapor degreaser. The particular steps which are used to remove the carbon layer 12*a* are not critical and a suitable solvent having the necessary constituency and characteristics is a matter of choice and can ordinarily be selected by one of ordinary skill in the art. Of course, carbon layer 12*a* must be removed without physically affecting the mask 12 so that the mask will retain its initial size, shape, hole locations, etc. With carbon layer 12*a* removed, mask 12 is now ready for permanent installation in the picture tube to serve its normal function with the result that the picture produced at the viewing face of the tube will be in the order of 240% brighter than in the case with smaller openings in the aperture mask.

Figure 3:
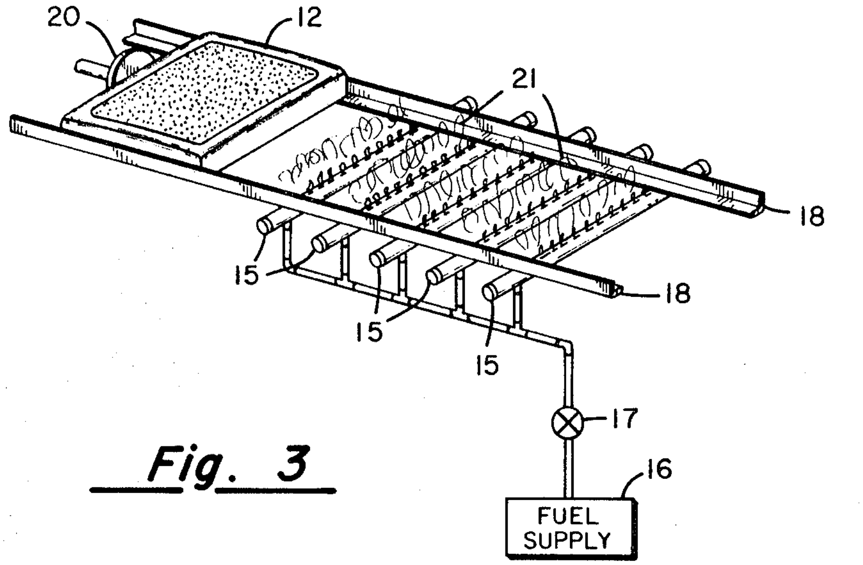
FIG. 3 shows an apparatus for applying the carbon coating to the mask in an assembly line process.

Referring to FIG. 3, there is shown apparatus for depositing carbon layer 12*a* on mask 12. The apparatus comprises a plurality of burner pipes 15 that are connected to a fuel supply 16 through valve 17. Although fuel used may be of different types, the preferred fuel is natural gas. Located above the burner pipe 15 are a pair of rails 18 that slidably support mask 19 as it is moved over the flame by mask advance member 20. In a typical assembly line operation the mask slides along rails 18 causing the carbon 21 from burner pipes 15 to deposit on the mask as it advances along rails 18. The preferred spacing of mask 12 from burner pipes 15 is approximately 6 to 8 inches although other spacings could also be used. In operation, the flame is adjusted so that it produces a smoky yellow or orange flame by adjusting valve 17.

Although the preferred combustible material is a gaseous fuel, it is envisioned that clean burning solid and liquid fuels could also be used, particularly those that vaporize before being burned.

I claim:

1. A mask usable in a color TV picture tube for laying down a pattern of colored phosphorus dots on the face plate of the tube and for later functioning as an aperture mask during normal operation of the tube comprising: a metallic layer containing a plurality of holes arranged in a first predetermined pattern, said holes of a predetermined size to produce a maximum brightness on the picture tube; and a layer of carbon located on one side of said metallic layer, said layer of carbon containing a plurality of holes located in an identical prearranged pattern to said first prearranged pattern, said plurality of holes having a second predetermined diameter which is smaller than said first predetermined diameter to enable laying down a pattern of colored phosphor dots.

2. The method of temporarily reducing the diameter of the aperture in an aperture mask comprising in combination: forming a mask having a plurality of prearranged holes of predetermined diameter; depositing carbon particles of uniform size for a predetermined time to produce a layer of carbon over said mask that uniformly and smoothly reduces the diameter of the holes of said mask.

3. The method of claim 2 wherein the mask is deposited with carbon from a natural gas flame that is starved of oxygen to produce incomplete combustion.

References Cited

UNITED STATES PATENTS

| | | | |
|---|---|---|---|
| 2,806,162 | 9/1957 | McQuillen et al. | 313—92BX |
| 3,070,441 | 12/1962 | Schwartz | 313—92BX |

ALFRED L. LEAVITT, Primary Examiner

E. G. WHITBY, Assistant Examiner

U.S. Cl. X.R.

96—36.1; 117—98, 99; 264—81; 313—85S, 92B